(12) United States Patent  (10) Patent No.: US 6,715,686 B1
Fahraeus  (45) Date of Patent: Apr. 6, 2004

(54) DEVICE FOR RECORDING INFORMATION IN DIFFERENT MODES

(75) Inventor: Christer Fahraeus, Lund (SE)

(73) Assignee: C Technologies AB, Lund (SE)

( * ) Notice: Subject to any disclaimer, the term of this patent is extended or adjusted under 35 U.S.C. 154(b) by 0 days.

(21) Appl. No.: 09/673,786
(22) PCT Filed: Apr. 30, 1999
(86) PCT No.: PCT/SE99/00715
§ 371 (c)(1), (2), (4) Date: Mar. 5, 2001
(87) PCT Pub. No.: WO99/60515
PCT Pub. Date: Nov. 25, 1999

Related U.S. Application Data
(60) Provisional application No. 60/091,320, filed on Jun. 30, 1998.

(30) Foreign Application Priority Data
Apr. 30, 1998  (SE) ............................................... 9801520

(51) Int. Cl.$^7$ ................................................. G06K 7/10
(52) U.S. Cl. ............................. 235/462.45; 235/462.12
(58) Field of Search ....................... 235/462.45, 462.12, 235/472.01

(56) References Cited

U.S. PATENT DOCUMENTS

| | | | |
|---|---|---|---|
| 4,949,391 A | 8/1990 | Faulkerson et al. | |
| 5,301,243 A | 4/1994 | Olschafskie et al. | |
| 5,369,262 A * | 11/1994 | Dvorkis et al. | 345/179 |
| 5,430,558 A * | 7/1995 | Sohaei et al. | 235/462.45 |
| 5,600,121 A * | 2/1997 | Kahn et al. | 235/462.3 |
| 5,783,811 A * | 7/1998 | Feng et al. | 235/462.42 |
| 5,793,033 A * | 8/1998 | Feng et al. | 235/462.32 |
| 5,815,222 A * | 9/1998 | Matsuda et al. | 349/1 |
| 6,062,475 A * | 5/2000 | Feng | 235/462.01 |
| 6,119,944 A * | 9/2000 | Mulla et al. | 235/462.43 |
| 6,435,413 B1 * | 8/2002 | Kumagai et al. | 235/462.45 |

FOREIGN PATENT DOCUMENTS

| | | |
|---|---|---|
| WO | WO9314470 | 7/1993 |
| WO | WO9632692 | 10/1996 |
| WO | WO9737320 | 10/1997 |

* cited by examiner

Primary Examiner—Thien M. Le
Assistant Examiner—Kimberly Nguyen
(74) Attorney, Agent, or Firm—Cooper & Dunham LLP

(57) ABSTRACT

A device for recording information has at least one light-sensitive sensor (8) with a two-dimensional sensor surface. The device is adjustable between a first mode and a second mode. In the first mode, the device is adapted to essentially abut against and be passed over a surface for imaging the same by means of a plurality of images. In the second mode, the device is adapted to image an object located at a distance.

12 Claims, 3 Drawing Sheets

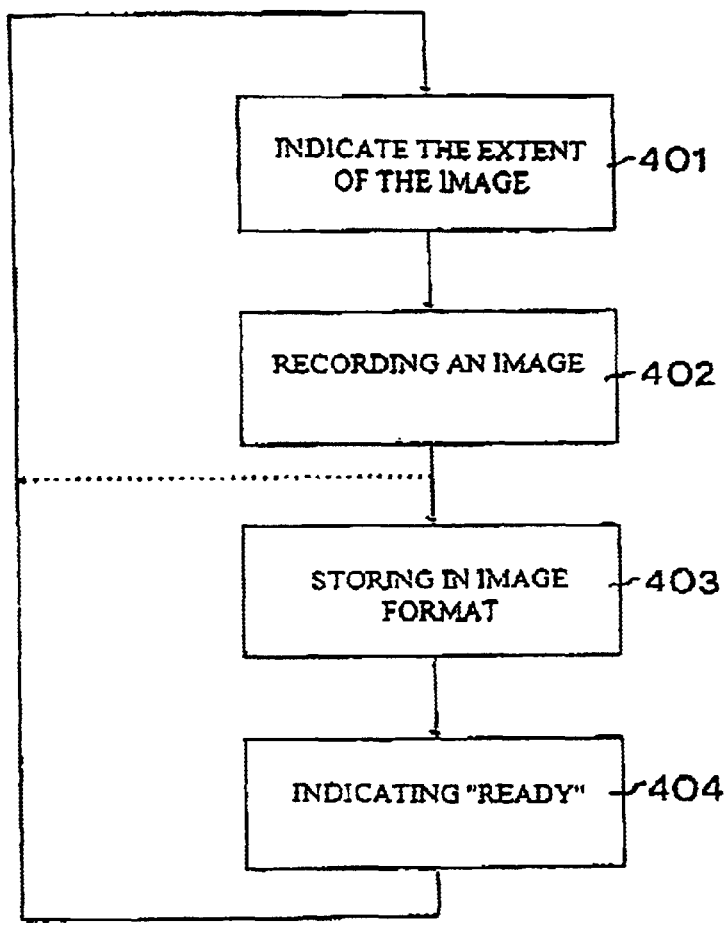
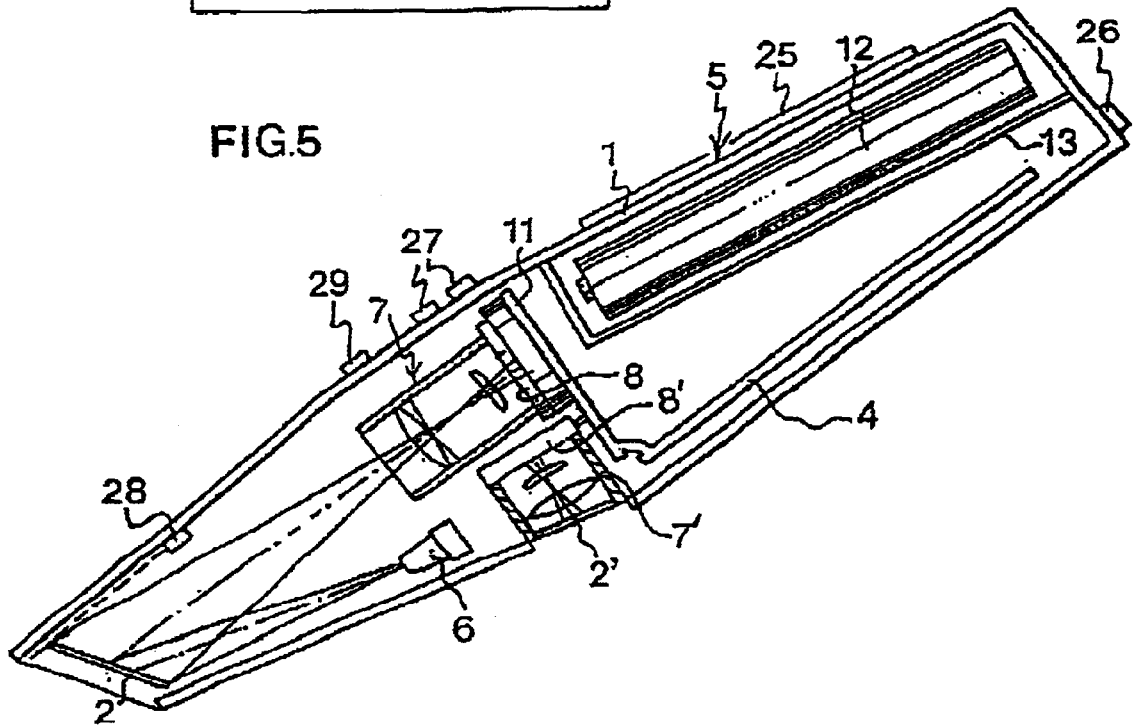

DEVICE FOR RECORDING INFORMATION IN DIFFERENT MODES

This application claims the benefit of provisional application Ser. No. 60/091,320 filed Jun. 30, 1998.

FIELD OF THE INVENTION

The present invention relates to a device for recording information of the type mentioned in the preamble to the appended claim 1.

BACKGROUND OF THE INVENTION

In recent years, the use of computers has increased among many very geographically mobile occupational groups. One reason for this is that one can work more efficiently by having direct access to a large amount of information while at the same time having good capabilities for processing new information simply and efficiently.

For this purpose, various types of portable computers have been developed. Equipped with suitable software, these types of computers provide excellent capabilities for processing and managing information in text as well as image format.

A drawback of these portable computers is that inputting information by the intermediary of a keyboard is often time-consuming in comparison with the time required for processing the information once it has been fed into the computer. In order to achieve faster and more efficient inputting, there have been attempts at finding simpler ways of feeding the information into the computer. In some cases, the text which is to be fed into the computer is replaced by a numerical code, for instance in the case of vehicle inspections. However, this requires more of the user, who has to keep track of several codes, which increases the risk of input errors.

In the daily work of many occupational groups there is a need for a simple way of putting together image and text information. Examples of this include various types of service and maintenance staff who work from some type of protocol and who wish to verify that a certain operation has been carried out; policemen at the site of an accident who wish to gather image data as well as personal data concerning witnesses, etc.; and researchers and other individuals whose work involves information retrieval and who wish to put together text and images from a number of different written documents.

In order to achieve more efficient inputting of information in these and similar situations one could use other input units, such as a scanner which records text information from a surface when it is passed over the same and a digital camera which takes pictures and stores them digitally so that they can be transferred to a computer for processing.

Scanners of both the stationary and the portable type are available. Stationary scanners are preferably used in connection with the recording of whole pages with printed text and image information, the scanner being passed over the page at a constant speed. The information is recorded by means of a light-sensitive sensor, which in stationary scanners often consists of a line sensor.

However, in most of the above situations, rather than the recording of a whole page of information a more selective recording of information is desired and, moreover, the scanner must also be easy to carry. For this reason, scanners of the hand-held type are much more interesting in these contexts. The sensors in these scanners can be either of the line type or of the two-dimensional type.

U.S. Pat. No. 4,949,391, for example, discloses a hand-held scanner for recording text. The scanner has a two-dimensional sensor, which records images of the underlying surface when the scanner is passed over the same.

Another hand-held scanner is described in U.S. Pat. No. 5,301,234. This scanner utilises a line sensor which records a sequence of vertical "slices" of the characters and of the spaces between them when the scanner is passed over the characters on the substrate. The "slices" are stored in the scanner as a digital bitmap. To enable the accurate recording of characters, the scanner is provided with position means in the form of a wheel which must be in contact with the underlying surface in connection with the recording of the characters to record the position of the scanner relative to the surface.

A drawback of using a computer, a scanner, and a digital camera at the same time is that the equipment becomes bulky and the user has to handle several units.

Thus, there is a need for equipment which is easy to handle, enabling fast and reliable recording of selective text and image information in situations of the kind described above in a format facilitating computer processing of the same at a later time.

SUMMARY OF THE INVENTION

The object of the present invention is to provide a solution to the above-mentioned problems by providing an improved device for recording information in text and image format.

This object is achieved according to the invention by a device having the features recited in the appended claim 1, with preferred embodiments in the appended claims 2–14.

The invention is based on the understanding that with a light-sensitive sensor with a two-dimensional sensor surface as the starting-point, a text recording function, i.e. a "scanner function", as well as an image recording function, i.e. a "camera function", can be easily created in the same device. More specifically, the device is adjustable between a first mode, in which the device is adapted to essentially abut against and be passed over a surface for imaging the same by means of a plurality of images, and a second mode, in which the device is adapted to image an object located at a distance.

The device can be adjusted by the user or automatically by the device if, for example, it detects that the distance to an object within its field of vision changes more than a predetermined value. The adjustment involves the adaptation of the device in some manner, e.g. physically or with respect to software, to make it suitable for use in the mode in question.

The first mode, or the "scanner mode", is intended for recording information located on a surface over which the device can be passed. The surface need not be plane. It is sufficient that it is even enough to enable the device to be moved in contact with the surface or directly adjacent to the same. The information, which can be said to be "two-dimensional" since it is located on a surface, can be composed of character sequences, e.g. one or several words or one or several sentences selected from a longer text. The characters can be letters, numbers, or other written characters or symbols. It is preferably stored in character-coded format. However, the information may also be composed of image information which is scanned by passing the device over the surface and recording a plurality of images of the image information.

The second mode is preferably used for recording "three-dimensional" information, i.e. when one is required to take pictures of objects. Preferably, in this mode, individual pictures are taken which are stored in image format. Naturally, this mode can also be used for taking pictures of surfaces from a distance, which are stored in image format.

Preferably, the same sensor is employed in both the first and the second mode, but it is also possible to use one sensor for each mode. In the latter case, the adjustment would involve changing the beam path in the device so that the imaging takes place with the aid of one sensor in the first mode and with the aid of the other sensor in the second mode. The beam path can be changed by adjusting one or more components in the device. Alternatively, a first opening with a first fixed beam path can be used in the first mode, and a second opening with a second fixed beam path can used in the second mode. Adjusting between the modes then comprises an adjustment of which sensor is activated for imaging.

It should be noted in this context that a two-dimensional sensor surface refers to the fact that the sensor surface must be able to image a surface with a matrix of pixels so that images with overlapping contents can be recorded.

Preferably, in the first mode, images with partially overlapping contents are recorded. The overlapping contents are used to put together the images to form a composite image, in which there is no duplication of content. Suitably, the putting-together is carried out with the aid of a signal-processing unit which, for example, may contain software for this purpose. By virtue of the fact that the overlapping content is used for putting together the images, the device need not contain any means, e.g. wheels, for recording the position of the device relative to the surface which is being imaged or for measuring the distance between the images. Moreover, the device can be moved at varying speeds while still permitting the images to be put together into a composite image.

The putting-together of the images is preferably carried out horizontally as well as vertically. This has the advantage that the device can be held at different angles and even be turned while being passed over the surface and yet the images can be put together well enough that the characters in the composite image can be identified and OCR processed.

The signal-processing unit preferably comprises software for identifying characters in the composite image and for storing the same in the device in character-coded format, preferably ASCII code. The character identification is advantageously carried out with the aid of a neural network. Storing in character-coded format requires considerably less memory space than if the same amount of information is stored, for example, as a bitmap image.

In order to project onto the sensor surface a clear image of the information to be recorded, i.e. the surface over which the device is passed in the first mode, or Of the object located at a distance in the second mode, the device preferably comprises at least one lens means, which is adjustable between a first position in the first mode and a second position in the second mode. In this way, two foci are provided for the device, i.e. two different imaging distances each providing a sharp image on the sensor surface. One focus is preferably used in the first mode where an object is located adjacent to the device and the other is preferably used in the second mode where an object is located at a distance from the device. The second position can suitably allow imaging of objects at distances of between 0.5 m and infinity. The different foci enable imaging of surfaces or objects at different distances from the device. The lens means may comprise one or more adjustable lenses. The device may contain one or more fixed lenses in addition to the one or more adjustable lenses. This embodiment is intended in the first place for the case where the device has a single light-sensitive sensor which is common for both modes.

In another embodiment, the device comprises a lens means, the position of which is variable for providing a variable focus or an autofocus function. This enables sharp imaging of an object located at an optional distance.

Furthermore, in an advantageous embodiment, the device is adapted to effect the imaging in the first mode with a lower resolution than the imaging in the second mode. This can, for example, be achieved in the first mode by making passive some of the sensor elements of the sensor or by saving only a part of the sensor values which are recorded by the sensor, or by using only a part of the saved sensor values in the subsequent processing of the images, such as in connection with the putting-together. The advantage of this embodiment is that it is possible to achieve faster, yet reliable, putting-together of the images in the first mode if their resolution is lower.

Moreover, the device advantageously comprises a transceiver for wireless communication with an external unit. In this way, information can be transferred between the device and, for example, an external computer. The transceiver can be an IR transceiver, a mobile radio transceiver, or some other suitable transceiver.

To make the device easy to handle in all types of is recording situations it is suitably of the hand-held type. This also expands its field of application considerably.

In a preferred embodiment, the device also comprises identification means for identifying the extent of the imaging. The identification means may, for example, comprise a display mounted on the device, or one or several luminous spots projected from the device onto the object for defining the extent of the imaging. By the fact that the user gets an idea of what the image of the object will look like once it is recorded, the chances of obtaining an accurate imaging result will be substantially better.

BRIEF DESCRIPTION OF THE DRAWINGS

The invention will be described in more detail below with reference to the accompanying schematic drawings showing, by way of example, a presently preferred embodiment of the invention.

FIG. 4 is a flowchart showing how the device is intended to function in the second mode;

FIG. 5 schematically shows a second embodiment of a device according to the invention.

DESCRIPTION OF A PREFERRED EMBODIMENT

STRUCTURE OF THE DEVICE

Figure 1:
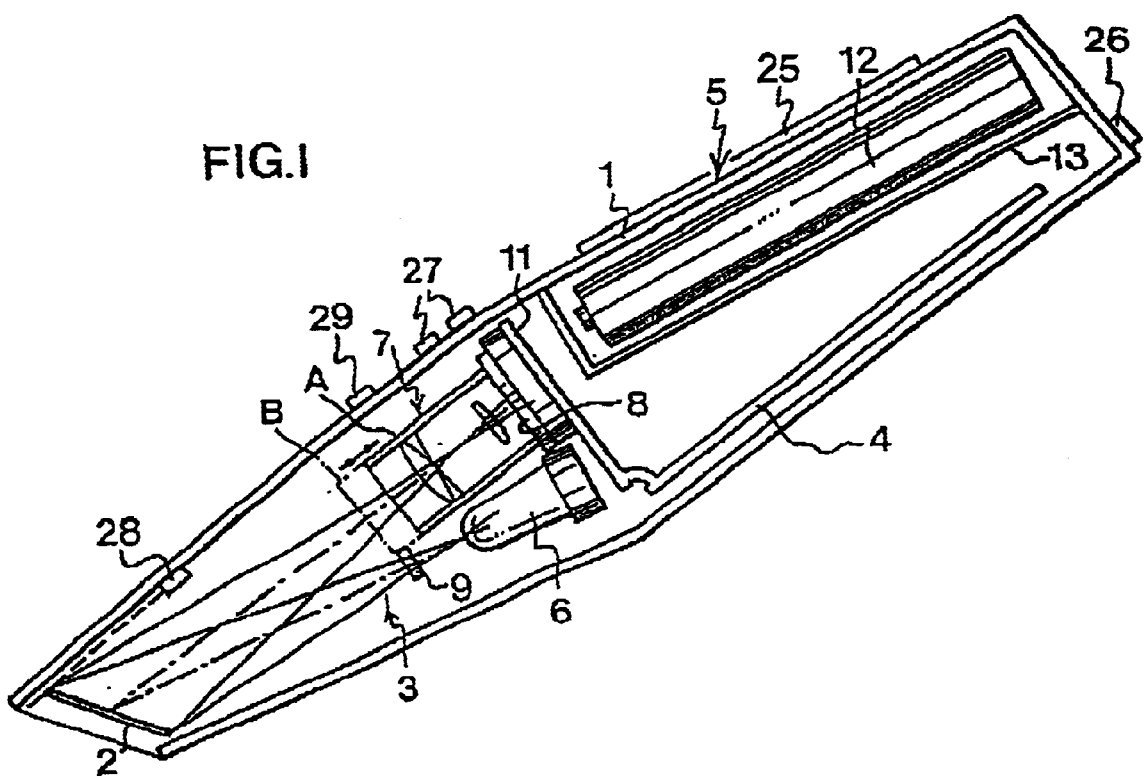
FIG. 1 schematically shows a first embodiment of a device according to the invention.

In the embodiment of the device according to the invention shown in FIG. 1, it comprises a casing 1 having approximately the same shape as a conventional highlighter pen. One short side of the casing has a window 2.

In the first mode of the device, the so-called scanning mode, the window 2 is intended to abut against or be held directly adjacent to a surface which one wishes to image. This surface can, for example, consist of a sheet of paper from which text is to be recorded. In the second mode of the device, the so-called camera mode, the window is intended to be directed at an object which is located at a distance and which one wishes to image.

The dimensions of the window 2 determine the size of the surface which can be imaged in the first mode. In the second mode, the dimensions of the window 2 only constitute a partial factor when determining which objects can be recorded. Another partial factor of equal importance in the second mode is the distance to the object which the user wishes to image by means of the device.

The window 2 forms an acute angle to the longitudial axis of the device so that in the first mode the user is guided to hold the device at a predetermined angle to the underlying surface. Furthermore, the window 2 is somewhat recessed in the casing 1 so that is does not wear against the underlying surface when the device is used in the first mode.

The casing 1 essentially contains an optics part 3, an electronic circuitry part 4, and a power supply 5.

The optics part 3 comprises a light-emitting diode (LED) 6, an adjustable lens system 7, and a light-sensitive sensor 8 which constitutes the interface with the electronic circuitry part 4.

The LED 6 is preferably used in the first mode where its task is to illuminate the part of the surface which is currently located under the window. A diffuser 9 is mounted in front of the LED 6 for diffusing the light. In the second mode, the object being imaged is preferably illuminated by means of other external light sources in the vicinity of the object.

The task of the lens system 7 is to project as accurately as possible an image of the surface located under the window 2, or of the object located within the field of vision of the window on the light-sensitive sensor 8. In connection with the adjustment between the two modes, the lens system 7 is moved between two positions so that two different foci are provided. FIG. 1 shows the lens system 7 in the first position A. The second position B is indicated, by way of illustration, by dashes extending from the lens system. The lens system 7 can be moved in the same way as in a camera with two foci. Moreover, if required, the lens system 7 will reduce the image so that it will fit on the light-sensitive surface of the sensor B.

In this example, the light-sensitive sensor 8 comprises a two-dimensional, square CCD unit (CCD charge coupled device) with a built-in A/D converter. Such sensors are commercially available. In this case, the sensor 8 is mounted at a small angle to the window 2 and on its own printed circuit board 11.

The power supply to the device is obtained from a battery 12 which is mounted in a separate compartment 13 in the casing.

Figure 2:
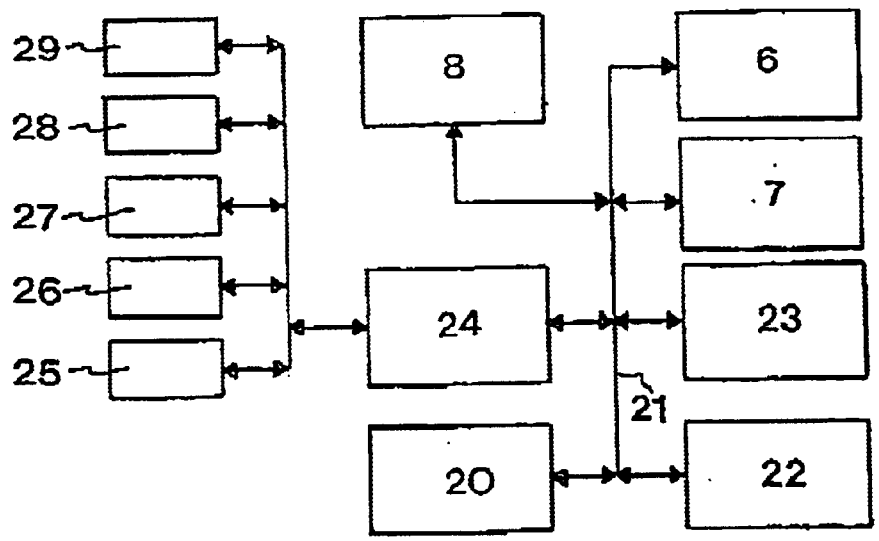
FIG. 2 is a block diagram of the electronic circuitry in an embodiment of a device according to the invention.

The block diagram in FIG. 2 schematically shows the electronic circuitry part 4. This comprises a processor 20, which by the intermediary of a bus 21 is connected to a ROM 22, in which the programs of the processor are stored, to a read/write memory 23, which constitutes the working memory of the processor and in which the images from the sensor as well as the characters identified and interpreted in the first mode are stored, to a control logic unit 24, as well as to the sensor 8, the lens system 7, and the LED 6.

The control logic unit 24 is in turn connected to a number of peripheral units, comprising a display 25, which is mounted in the casing, an IR transceiver 26 for transferring information to/from an external computer, buttons 27, by means of which the user can control the 1device, a tracer LED 28 which emits a light beam, making it easier for the user to follow the text, as well as an indicating device 29, e.g. a couple of LEDs, indicating which mode the device is in and whether or not recording is taking place. Control signals to the memories, the sensor, and the peripheral units are generated in the control logic unit 24. The control logic also handles generation and prioritisation of interrupts to the processor. The buttons 27, the IR transceiver 26, the display 25 and the tracer LED 28, and the LED 6 are accessed by the processor writing and reading in the register in the control logic unit. The buttons 27 generate interrupts to the processor 20 when they are activated.

Operation of the Device in the First Mode

In the first mode, the device operates as follows. Suppose that a user wishes to record text from a sheet of paper. In this case, he holds the device against the sheet in the location where he wishes to start recording a character sequence. He presses a button 27 to activate the device and passes the latter over the text he wishes to record, following the text in the same way as when one reads the text. The tracer LED 28 emits a light beam which facilitates following the lines. When the user activates the device, the processor 20 commands the LED 6 to begin generating strobe pulses at a predetermined frequency of 25 Hz, whereupon the sensor records images with partially overlapping contents which are stored in the read/write memory 23. However, text which is stored in the form of images requires a large amount of memory space. Consequently, to save memory space in this mode, the characters in the images are identified and stored with the aid of ASCII code. When the user has passed the device over the selected text or has come to the end of a line, he lifts the device off the sheet and releases the activating button, whereupon the processor 20 turns off the LED 6. When the selected text has been recorded, the user can control the device to show the recorded text on the display 25 or to transfer the text to an external computer by the intermediary of the IR transceiver 26. The possibility of showing the scanned information directly on the display has proven very important since a user often wishes to verify that the correct information has been scanned.

Figure 3:
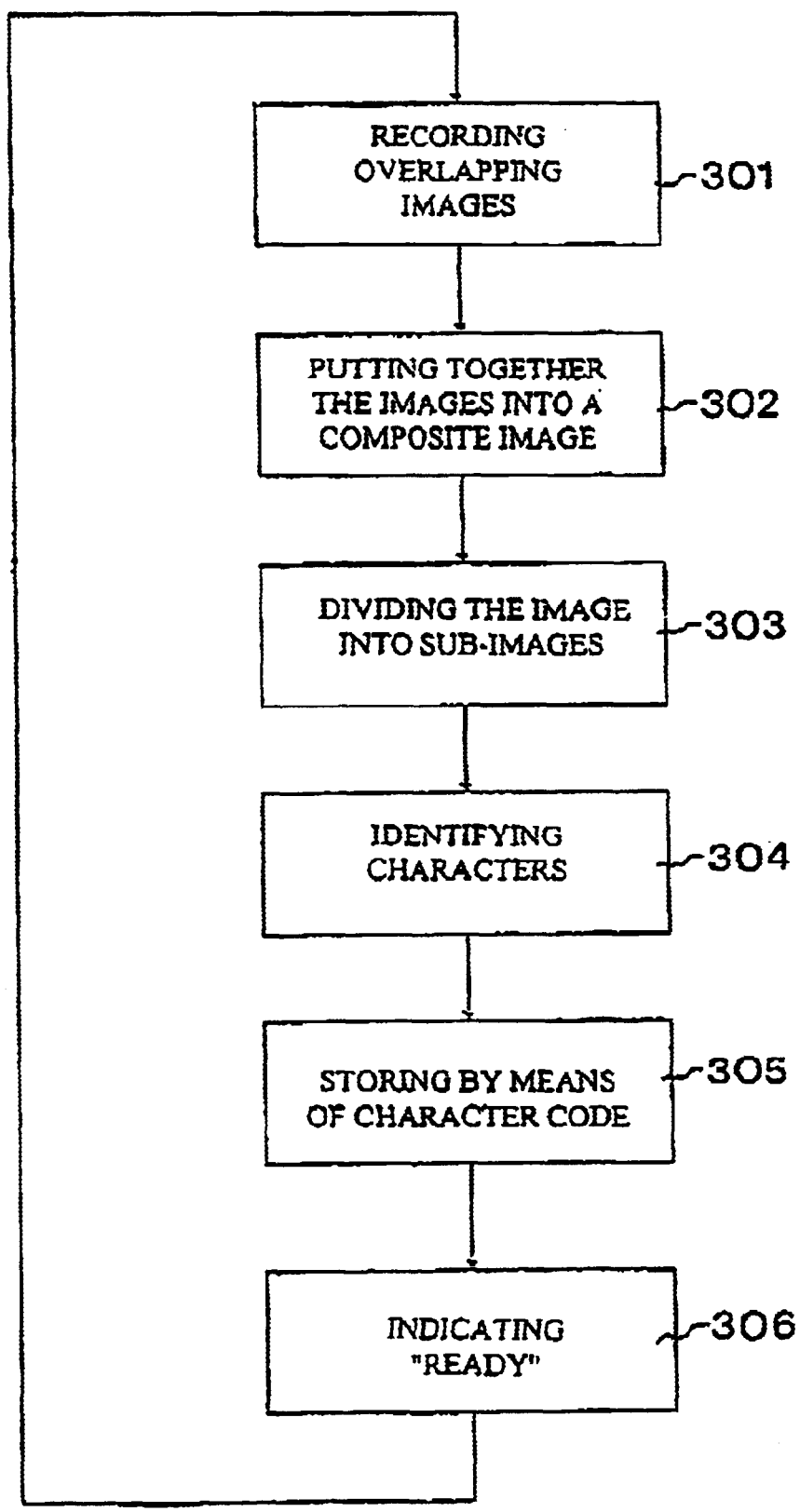
FIG. 3 is a flowchart showing how the device is intended to function in the first mode.

The flowchart in FIG. 3 shows how the device is adapted to work in the first mode. In step 301, images with overlapping contents are recorded with the aid of the above device and are stored in a current image area in the read/write memory 23. The images are stored as images, i.e. with the aid of a plurality of pixels, each having a grey scale value in a range from white to black.

As soon as an image has been stored in the current image area, the putting-together of the image with the previous image is suitably commenced, step 302, if such an image is available. If there is no previous image, the current image is entered directly into a line image area in the read/write memory.

In order to determine how the current image is to be put together with the previous image so that the best match is achieved between the contents of the images, every possible overlap position between the images is examined, at the pixel level, and an overlap measurement is determined as follows:

1) For each overlapping pixel position, the grey scale values of the two relevant pixels are added up if the latter are not white. Such a pixel position in which none of the pixels are white is designated a plus position.

2) The grey scale sums for all the plus positions are added up.

3) The neighbours of each pixel position are examined. If an overlapping pixel position is not a neighbour of a plus position and consists of a pixel which is white and a pixel position which is not white, the grey scale value of the non-white pixel is subtracted, possibly multiplied by a constant, from the sum in point 2).

4) The overlap position providing the highest overlap measurement as stated above is selected. In the resulting composite image the mean value of the grey scale value of the overlapping pixels is used. In this way, noise can be suppressed in the overlap area. The putting-together is thus carried out both vertically and horizontally. If it is detected that, when being put together, the images do not end up on a horizontal line, the composite image is suitably adjusted so that it becomes horizontal, for example by turning the composite image.

Our Swedish patent application No. 9704924-1 and the corresponding U.S. application Ser. No. 09/024,641, describe an alternative way of matching the images in order to find the best overlap position. The content of these applications is herewith incorporated by reference.

The composite image gradually develops in the line image area in the read/write memory. It is preferred that the line image area be big enough to store an A4 line of normal typewritten text.

In step 303, the software of the processor 20 divides the composite image in the line image memory area into sub-images each containing only one character. The purpose of this is to create input signals to a neural network software which is to interpret the characters. The division is effected by adding up the grey scale values of the pixels for each pixel row and each pixel column in the composite image. By studying the local intensity minima for the row sums and column sums thus obtained, boundaries can be determined for the extent of each character in the image.

Subsequently, in step 304, each character in the composite image of the character sequence imaged is interpreted. The grey scale values of the pixels which together constitute a sub-image containing only one character are fed as input signals to a neural network. Each output from the neural network represents a character which the network can identify. The output from the network which has the highest output signal is chosen and the character thus chosen is stored in step 305 using a predetermined character code format, for example ASCII code, in the read/write memory 23 in a memory area for interpreted characters. When the character identification and storing in character-coded format is completed, the processor activates the indicating device 29 to inform the user that it is ready to record a new character sequence, step 306. Subsequently, it goes back to step 301.

In the first mode, the steps described above are thus carried out by the processor 20 with the aid of the associated units and suitable software. Such software can be created by the skilled person with the aid of the above instructions. The character recognition is performed with the aid of neural network software, which is adapted in a suitable manner. Neural network software is commercially available from, for example, MATLAB Neural Network Toolbox, The Math-Works Inc., 24 Prime Park Way, Natick, Mass. 01760, USA.

Adjustment of the Device Between the two Modes

Suppose that the user now wishes to supplement the scanned text with an image of an object. In this case, he indicates this by pressing the button 27. Then lens system is then moved to the position B. This movement results in the focus of the device being changed so that a clear image of an object located at a distance can be projected onto the light-sensitive surface of the sensor 8.

Operation of the Device in the Second Mode

In the second mode, the device operates as follows. The user directs the window of the device at the object which is located at a distance and which he wishes to image. On the display 25 of the device, the user can see the image which will be recorded. When the user is satisfied with the appearance of the image, he presses a button 27 to activate the device which then records an image of the object and stores the image in image format in the memory 22. When the image of the object has been recorded, the user can control the device to either show the recorded image on the display 25 or transfer the image to an external computer by the intermediary of the IR transceiver 26. The recorded image can then be supplemented with additional text information by the user setting the device to the first mode and recording text or other characters. Subsequently, the text and image information recorded can be shown either on the display 25 of the device or on an external computer.

The flowchart in FIG. 4 shows how the device is adapted to operate in the second mode. In step 401, the extent of the image is indicated on the display 25 of the device. When the user is satisfied with the appearance of the image, he presses the button 27 and, in step 402, the image is then recorded. The image is recorded in the current image area of the read/write memory with the aid of a plurality of pixels, which can have either grey scale values from white to black, or colour values. The user can then choose whether or not he wishes to keep the current image. If the user decides to keep the image, the process continues along the solid line to step 403, in which the image is stored in the memory 23. When the image has been stored, the device indicates, in step 404, that it is ready to scan a new image. If the user does not wish to keep the image, the process continues, from step 402, along the dashed line back to step 401 in order for a new image to be scanned.

Alternative Embodiments

The present invention can, of course, be modified within the scope of the appended claims. The lens means may, for example, comprise a lens which is put on like a "cap" on the front of the device in one of the modes.

In the embodiment described above, the device has a single light-sensitive sensor which is used in the first as well as the second mode. As mentioned above, however, the device can alternatively have a sensor for each mode. FIG. 5 shows schematically how the embodiment in FIG. 1 could be modified to have two sensors. In the embodiment in FIG. 5, the device has a second window 2' in the side of the casing, a second light-sensitive sensor 8' with a two-dimensional sensor surface, and a second lens means 7' which can have a variable focus. The electronic circuitry part is the same as in the embodiment in FIG. 1. When adjusting from one mode to the other, an adjustment takes place of which sensor is activated for imaging and an adjustment takes place of from which sensor the electronic circuitry part collects images.

What is claimed is:

1. A device for recording information by means of imaging with the aid of at least one light-sensitive sensor with a two-dimensional sensor surface, characterized in that:

the device has:
an adjustable lens means providing a plurality of lens positions;
a first mode, in which a plurality of images of a surface are recorded by the sensor through the adjustable lens means at a first focus position which provides projections of images of the surface onto the sensor when the device is directly adjacent the surface more accurately than at a second focus position, each image of the plurality of images containing content which partially overlaps content of another image of the plurality of images, such that the overlapping contents of the images are utilized by the device to put together the images into a composite image; and a second mode, in which at least one image is recorded by the sensor of a field of vision through the adjustable lens means at the second focus position which provides projections of the image of the field of vision onto the sensor when the device is not positioned directly adjacent the surface more accurately than at the first focus position, and such that the first focus position and the second focus position are different.

2. A device according to claim 1, wherein said device is adapted to store information in character-coded format in the first mode and in image format in the second mode.

3. A device according to claim 1, wherein the device comprises two light-sensitive sensors each having a two-dimensional sensor surface, one sensor being used in the first mode and the other sensor in the second mode.

4. A device according to claim 1, further comprising a signal-processing unit, which is adapted to utilize the partially overlapping contents of the images for putting together the images into the composite image, no recording being required of the position of the device relative to the surface which is being imaged.

5. A device according to claim 4, wherein the signal-processing unit is adapted to carry out the putting-together of the images horizontally as well as vertically.

6. A device according to claim 4, wherein the signal-processing unit further comprises software for identifying characters in the composite image and for storing the same in the device in character-coded format.

7. A device according to claim 1, further comprising a transceiver for wireless communication with an external unit.

8. A device according to claim 1, wherein said device is adapted to effect the imaging in the first mode with lower resolution than the imaging in the second mode.

9. A device according to claim 1, wherein said device is of the hand-held type.

10. A device according to claim 1, further comprising identification means for identifying the extent of the imaging.

11. A device according to claim 10, wherein the identification means comprises a display.

12. A device according to claim 10, wherein the identification means is adapted to project at least one luminous spot onto the surface or the object to be imaged.

* * * * *